(12) United States Patent
Minardi et al.

(10) Patent No.: US 6,567,206 B1
(45) Date of Patent: May 20, 2003

(54) MULTI-STAGE OPTICAL SWITCHING DEVICE

(75) Inventors: John E. Minardi, Dayton, OH (US); John L. Janning, Dayton, OH (US)

(73) Assignee: St. Clair Intellectual Property Consultants, Inc., Grosse Pointe, MI (US)

(*) Notice: Subject to any disclaimer, the term of this patent is extended or adjusted under 35 U.S.C. 154(b) by 0 days.

(21) Appl. No.: 10/027,096

(22) Filed: Dec. 20, 2001

(51) Int. Cl.[7] .................. G02B 26/00; G02F 1/03; G02F 1/07; G02F 1/13
(52) U.S. Cl. ............... 359/320; 359/245; 359/296; 349/202
(58) Field of Search .................. 359/244, 245, 359/265, 279, 288, 296, 298, 320, 322, 324, 316; 349/202

(56) References Cited

U.S. PATENT DOCUMENTS

| | | | |
|---|---|---|---|
| 3,539,244 A | 11/1970 | Marks | 359/311 |
| 3,834,792 A | 9/1974 | Janning | 349/132 |
| 4,313,651 A | 2/1982 | Miller, Jr. | 359/315 |
| 4,386,827 A | 6/1983 | Scifres et al. | 359/315 |
| 4,462,658 A | 7/1984 | Scifres et al. | 385/8 |
| 4,706,094 A | 11/1987 | Kubick | 343/754 |
| 4,877,312 A * | 10/1989 | Huignard et al. | 359/243 |
| 4,925,261 A | 5/1990 | Byckling et al. | 359/17 |
| 4,930,853 A | 6/1990 | Grego | 359/315 |
| 4,973,121 A | 11/1990 | Brophy et al. | 385/10 |
| 4,973,900 A | 11/1990 | Aoshima et al. | 324/96 |
| 4,995,689 A | 2/1991 | Sarraf | 385/10 |
| 5,055,770 A | 10/1991 | Takahashi et al. | 324/96 |
| 5,071,253 A | 12/1991 | Chase | 359/245 |
| 5,175,642 A | 12/1992 | Funato | 359/298 |
| 5,253,098 A | 10/1993 | Hikita et al. | 359/213 |
| 5,291,566 A | 3/1994 | Harris | 385/8 |
| 5,291,567 A * | 3/1994 | Revelli, Jr. et al. | 385/8 |
| 5,303,316 A | 4/1994 | Hammer | 385/37 |
| 5,658,439 A * | 8/1997 | Burkle et al. | 204/192.23 |
| 2002/0075783 A1 * | 6/2002 | Alon et al. | 369/112.02 |
| 2002/0118433 A1 * | 8/2002 | Romanovsky | 359/245 |

FOREIGN PATENT DOCUMENTS

DE  2215898 A  *  9/1989

* cited by examiner

*Primary Examiner*—Georgia Epps
*Assistant Examiner*—William Choi
(74) *Attorney, Agent, or Firm*—Rader, Fishman & Grauer PLLC

(57) ABSTRACT

An optical switching device contains an active stage coupled to a passive stage. The index of refraction in the active stage is variable to change the entry direction of a light beam into the passive stage, which has a fixed index of refraction. Because the light beam can enter the passive stage at different angles, the exit direction of the light beam from the passive stage can be changed. The resulting optical switch allows switching without any mechanical components.

7 Claims, 3 Drawing Sheets

MULTI-STAGE OPTICAL SWITCHING DEVICE

TECHNICAL FIELD

The present invention relates to optical devices, and more particularly to an optical device that refracts optical beams using electro-optic or photorefractive materials.

BACKGROUND OF THE INVENTION

Mechanical switches are used in many applications for controlling the operation of a given device. Switches with mechanical moving parts are familiar and relatively simple, but suffer from problems common to all mechanical devices, including physical deterioration due to normal usage.

There have been several proposed devices that switch light beams using electro-optic or photorefractive materials. Operation of one or more devices may then be controlled by the changing direction of the light beams. Many of these devices use Kerr cells to change an index of refraction in the electro-optic or photorefractive material, but Kerr cells require high voltages to switch the beam direction. The high voltages required make these types of switches impractical for consumer devices.

There is a need for a switchable or scannable optical device that does not experience the shortcomings of currently known devices.

SUMMARY OF THE INVENTION

Accordingly, the invention is directed to an optical device, comprising a first element having a first index of refraction and a second element that communicates with the first element and has a second index of refraction, wherein one of said first and second elements can change the entry direction of a radiated beam into the other of said first and second elements.

The invention is also directed to an optical device, comprising an active element having a first conductive substrate, a second conductive substrate, a first orienting layer; and a second orienting layer disposed on the first and second conductive substrates and facing one another, and a refractive layer disposed between the first and second orienting layers and having a variable index of refraction that is responsive to the electric field. The optical device also includes a passive element, wherein the active element can change an entry direction of a radiated beam into the passive element.

The invention is further directed to a method of manufacturing an optical device, the method comprising providing an active element having a refractive layer with a variable index of refraction between first and second conductive layers and coupling the active element to a passive element having a fixed or fixable index of refraction to form the optical device, wherein a voltage applied to the first and second conductive layers results in an electric field.

The invention is also directed to a method of manufacturing an optical device, comprising providing a first element having a first index of refraction, providing a second element having a second index of refraction, and establishing communication between the first and the second elements.

Other embodiments, variations and advantages of the invention will be understood in view of the description below.

DETAILED DESCRIPTION OF THE PREFERRED EMBODIMENTS

Figure 1:
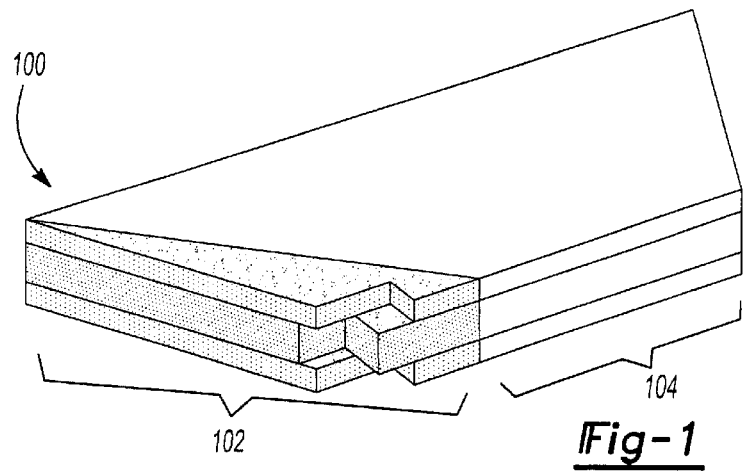
FIG. 1 is a representative diagram illustrating one embodiment of the inventive optical device.
Figure 2:
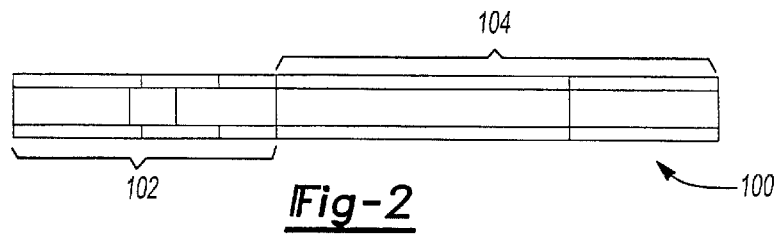
FIG. 2 is an edge view of the optical device shown in FIG. 1.

FIG. 1 is a representative diagram of one embodiment of the inventive optical device 100, and FIG. 2 is a bottom view of the device in FIG. 1. Generally, the inventive optical device 100 changes the direction of an optical beam from one position to another when a voltage is applied to the device 100, allowing the beam to be selectably positioned, reflected and/or transmitted. The optical device 100 in this embodiment includes an active element 102 and a passive element 104. The active element 102 has a variable index of refraction, while the passive element 104 has a fixed or fixable index of refraction. The passive element 104 may act as a total internal reflection (TIR) stage, which will be explained in greater detail below.

Figure 3A:
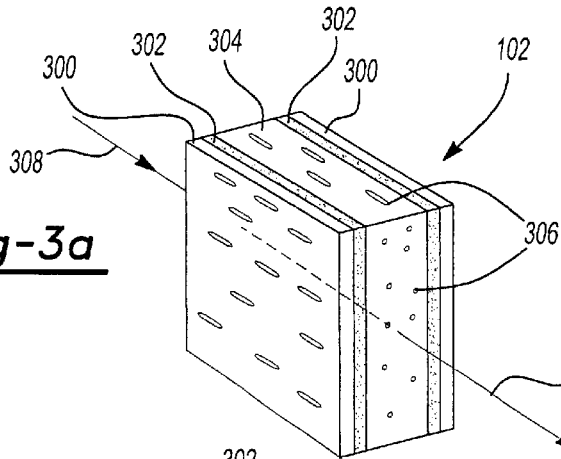
FIGS. 3a and 3b are representative diagrams illustrating an active element used in the embodiment shown in FIG. 1.
Figure 3B:
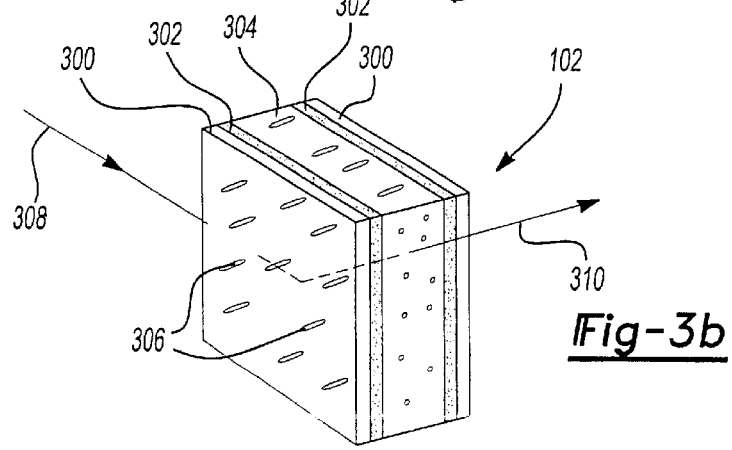

FIGS. 3a and 3b are representative diagrams illustrating the components in the active element 102. The active element 102 includes two electrically conductive plates 300 facing each other with an orienting layer 302 deposited on each facing surface of the conductive plates 300 and a refractive layer 304 sandwiched in between the orienting layers 302. Note that FIGS. 3a and 3b, as well as the remaining figures, are not drawn to scale and only illustrate the relative arrangement between different elements of the invention.

Figure 4A:
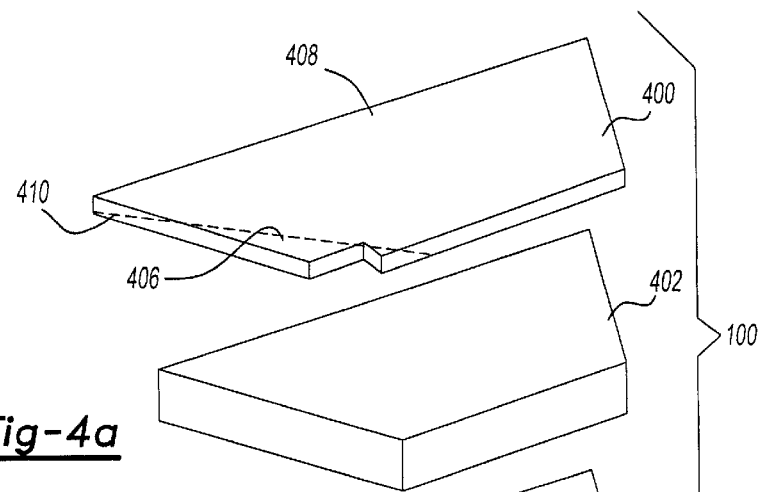
FIGS. 4a through 4c illustrate one method for manufacturing the inventive optical device.
Figure 4B:
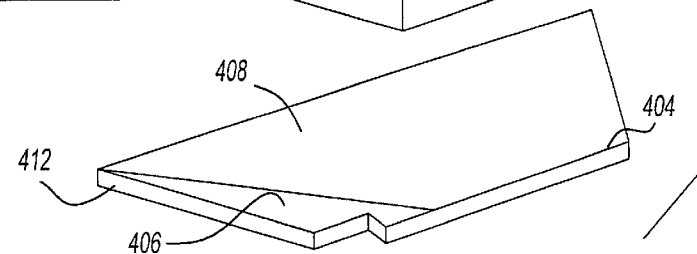
Figure 4C:
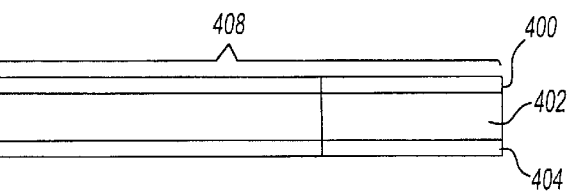

The electrically conductive plates 300 are substantially planar and can be made of any conductive material. For example, the conductive plates 300 can be made of metal. Alternatively, the conductive plates 300 can be constructed by depositing an electrically-conductive material, such as indium-tin-oxide, onto a glass plate, as illustrated in FIGS. 4a through 4c and explained in greater detail below.

The orienting layers 302 are deposited onto the conductive plates 300 and are generally used if liquid crystal molecules 306 constitutes the refractive layer 304. In one embodiment, the orienting layers 302 are thin vacuum deposited films of silicon monoxide, magnesium fluoride, or other material that can align the liquid crystal molecules 306 in the refractive layer 304. One possible way to deposit the films forming the orienting layers 302 is described in U.S. Pat. No. 3,834,792 to Janning, the disclosure of which is incorporated herein by reference in its entirety. U.S. Pat. No. 3,834,792 teaches depositing the film at an oblique angle of around 85 degrees and at a thickness of approximately 70 Angstroms. Other film structures can also be used in the orienting layers 302 as long as the film structure can change liquid crystal molecular alignment.

Of course, if the refractive layer 304 is constructed with a material other than a liquid crystal layer, the orienting layer 302 structure and material can be changed to be compatible with the refractive layer 304 or omitted altogether. Possible refractive layer 304 materials include liquid crystal molecules, as explained above, poly (N-vinylcarbazole) (PVK), PMMA or other photorefractive materials. Note that regardless of the specific material used for the refractive layer 304, the orienting layer 302 can be omitted if the refractive layer 304 itself can be oriented for optimum performance.

The refractive layer 304 can be a material such as liquid crystal molecules or another material whose index of refraction can change as a surrounding electric field changes. In this embodiment, the two conductive plates 300 are separated by approximately 10 microns and have the refractive layer 304 arranged between them.

As is known in the art, the liquid crystal molecules 306 are nematic, or cigar-shaped. In one embodiment, the liquid crystal molecules 306 constitute the refractive layer 304 and are initially aligned in a substantially heterotropic alignment, where the molecules 306 are parallel to the direction of the deposited thin film 302 and lie substantially parallel to the conductive plates 300. This alignment allows efficient operation of the optical device 100 by orienting the liquid crystal molecules 306 so that the initial index of refraction is at a minimum. FIG. 3*a* illustrates one example where the input light beam 308 is parallel to the alignment angle of the liquid crystal molecules in the refractive layer 304, allowing the output light beam 310 from the active element 102 to go directly into the passive element. In one embodiment, the liquid crystal molecular alignment is selected to allow the maximum possible change in the index of refraction in the refractive layer 304.

Note that if the refractive layer 304 is composed of liquid crystal molecules, then copper should not be used in the conductive plates 300 because copper aligns the liquid crystal molecules 306 homeotropically (i.e., perpendicular to the conductive plate) rather than heterotropically, interfering with the desired operation of the orienting layer 302.

With this active element 102 structure, applying a low voltage to the conductive plates 300 results in an electric field, causing the material in the refractive layer 304 to change its index of refraction by changing the arrangement of the liquid crystal molecules 306 as shown in FIG. 3*b*. When the light beam 308 is directed through the refractive layer 304, the change in the refractive layer's index of refraction deflects the light beam's output path 310 from its original path by an amount dependent on the magnitude of the applied voltage and its corresponding electric field.

FIG. 3*a* shows the active element 102 when the refractive layer 304 is at its lowest index of refraction, while FIG. 3*b* shows the active element 102 after an electric field changes the index of refraction in the refractive layer 304. As shown in FIG. 3*a*, before voltage is applied to the conductive plates 300, the liquid crystal molecules 306 are heterotropically aligned and are parallel to the conductive plates 300. Because both orienting layers 302 are deposited in the same direction in this embodiment, all of the liquid crystal molecules 306 in the refractive layer 304 will lie in the same direction, keeping the index of refraction at a minimum when no voltage is applied. In this case, the existing light beam 308 will travel through the refractive layer 304 with its initial no-deflection orientation into the passive element 104. The actual minimum index of refraction is determined by the angle at which the input light beam enters the active element 102 and the molecular alignment within the refractive layer.

When a voltage is applied to the conductive plates 300 to generate an electric field, the liquid crystal molecules 306 will shift and align themselves parallel to the electric field when a high enough voltage is applied, increasing the index of refraction of the refractive layer 304 to its maximum value for the input light beam 308. As a result, the input light beam 308 will be deflected from its original direction. The output 310 will be at a different angle than its original no-deflection orientation angle, and thereby enter the passive element 104 at a different angle. For example, if liquid crystal molecules are used for the refractive layer, the index of refraction will be approximately 1.56 in the absence of an electric field and 1.73 in the presence of a sufficient electric field.

FIGS. 4*a* through 4*c* illustrates one manner in which the inventive optical device 100 can be manufactured and assembled using glass plates. In this embodiment, the active and passive elements 102, 104 are formed simultaneously rather than as separate parts. More particularly, the embodiment shown in FIGS. 4*a* through 4*c* includes three glass plates 400, 402, 404 that are layered together. The two outside glass plates 400, 404 are approximately 1.1 mm thick and each have a layer of indium-tin-oxide or other material 406 on a portion of the plate that will eventually become the active element 102. The indium-tin-oxide layers 406 deposited on the glass plates 400, 404 act as the conductive layers 300 in the active element 102, while the remaining, uncoated portions 408 of the glass plates 400, 404 will form part of the passive element 104 in the finished device 100. If desired, the edges 410, 412 of the two outside plates 400, 404 can have different profiles to provide areas for electrical contact to the two outside plates 400, 404.

The third, middle glass plate 402 is sandwiched in between the two outside plates 400, 404 and does not contact any portion of the indium-tin-oxide layers 406. The middle plate 402 is preferably thinner than the outside plates 400, 404, about 10 microns thick and acts as the refractive layer 304 of the passive element 104 and as a spacer between the two outside plates 400, 404. The refractive layer material 414, such as liquid crystal material, is placed in the space formed by the middle plate 402 to complete the active element 102. The middle plate 402 also acts as part of the passive element 100. Once the three layers 400, 402, 404 are assembled together, a thin clear coating (not shown) can be applied along the device's periphery to hold the layers together and contain the materials in between the layers.

Note that the passive element 104 does not necessarily have to be an element 402 having a fixed index of refraction. The passive element 104 can also be an element 402 whose index of refraction can be varied as long as the index is fixable at a predetermined value when used in the optical device.

The passive element 104 acts as a total internal reflection (TIR) stage and the angle at which light exits the passive element 104 can be controlled by changing the angle at which light enters the passive element 104.

Figure 5A:
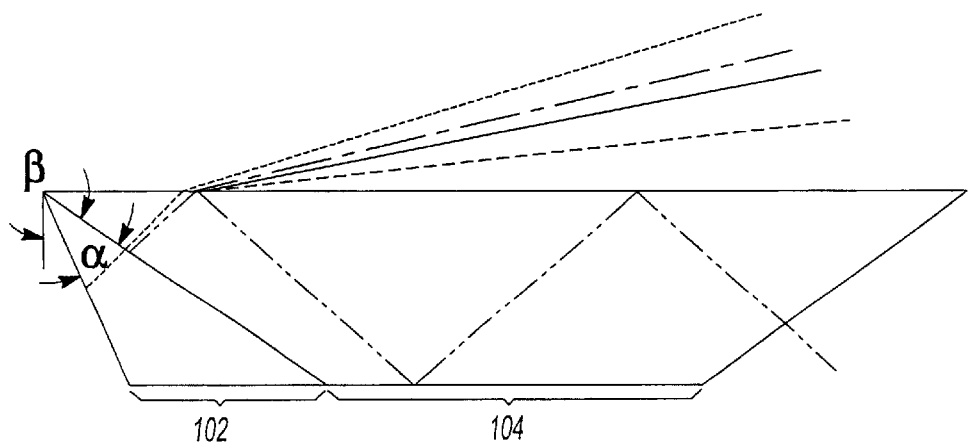
FIGS. 5a and 5b illustrate different reflected and refracted light beam paths based on changes in indexes of refraction.
Figure 5B:
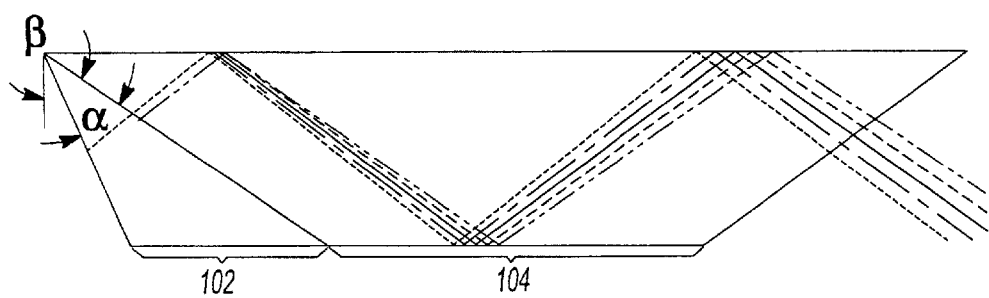

Equations (1) through (5) below explain the relationships between the incidence angle at various interfaces in the optical device, the refracted angles in both the active and the passive elements, the minimum incidence angle needed for TIR, and the relationship between the index of refraction in the passive and active elements 102, 104 and their corresponding refracted angles. The relationships of these angles given by the equations are also a function of the geometric parameters $\alpha$ and $\beta$ shown in FIGS. 5*a* and 5*b*.

$$r_1, (i, n_1) = \arcsin\left(\frac{\sin(i)}{n_1}\right) \qquad (1)$$

$$i_1(i, n_1, \alpha) = r_1(i, n_1) - \alpha \qquad (2)$$

$$r_2(i, n_1, n_2, \alpha) = \arcsin\left(n_1 \frac{\sin(i_1(i, n_1, \alpha))}{n_2}\right) \qquad (3)$$

$$i_2(i, n_1, n_2, \alpha, \beta) = \frac{\pi}{2} - (\beta + r_2(i, n_1, n_2, \alpha)) \qquad (4)$$

$$TIR(n_2, n_{exit}) = \arcsin\left(\frac{n_{exit}}{n_2}\right) \quad (5)$$

where i=the incidence angle at the air/active-element interface $r_1$=the refracted angle in medium 1 (the refractive layer 304 in the active element 102 in this example) with a refractive index of $n_1$;

$i_1$=the incidence angle at the angled interface (in this example, the angled interface between the active element 102 and the passive element 104);

$r_2$=the refracted angle in medium 2 (the passive element 104 in this example) with a refractive index of $n_2$;

$i_2$=the incidence angle at which the light beam strikes the interface between medium 2 and the air;

TIR=the minimum incidence angle needed for total internal reflection in medium 2;

$n_{exit}$=the refractive index of the exit material (in this example, the exit material is the ambient air, which has a refractive index of 1.0);

α=the angle formed by the interface between medium 1 and the air and the interface between medium 1 and medium 2, as shown in FIGS. 5a and 5b;

β=the angle formed by the interface between medium 1 and medium 2 and a vertical line, as shown in FIGS. 5a and 5b.

Note that the light beam in the passive element 104 can either exit the passive element 104 or be reflected back into the passive element 104, depending on the incidence angle $i_2$. If $i_2$<TIR, then the light beam is only slightly reflected back into the passive element 104, its angle of refraction $rr_3$ of the predominantly transmitted fraction is as follows:

$$rr_3(i, n_1, n_2, \alpha, \beta, n_{exit}) = \arcsin\left(\frac{n_2}{n_{exit}}\sin(i_2(i, n_1, n_2, \alpha, \beta))\right) \quad (6)$$

If, however, $i_2 \geq$ TIR, then the light beam is totally reflected back into the passive element 104, the angle of reflection $r_3$ is equal to $i_2$:

$$r_3(i, n_1, n_2, \alpha, \beta) = i_2(i, n_1, n_2, \alpha, \beta) \quad (7)$$

As can be seen from Equations (6) and (7), if the incidence angle $i_2$ is equal to or greater than TIR, the light beam will be totally reflected within the passive element 104 at an angle of reflection $r_3$ equal to $i_2$. Conversely, if the incidence angle $i_2$ is less than TIR, the light beam will only be partially reflected back into the passive element 104 and instead the major portion will exit the passive element 104 at a refractive angle of $rr_3$. In one embodiment of the invention, the light at the interface between the active element 102 and the passive element 104 is partially transmitted and partially reflected. The partial reflection is an undesirable, spurious signal whose magnitude attenuates each time it is reflected. Increasing the length of the passive element 104 increases the number of reflections, thereby reducing the magnitude of the spurious signal to a more desirable level.

Thus, varying the index of refraction in the active element to change the angle at which the light beam enters the passive element allows the inventive optical device to act as an optical switch by directing the light beam to exit the passive element either through its side or its end. For example, assume that the active element 102 is made using liquid crystal molecules for the refractive material 304 and that the geometric angles are set to α=50 degrees, and β=30 degrees. The example also assumes that the index of refraction $n_2$ in the passive element 104 is $n_2$=1.46 and $n_{exit}$=1 (the refractive index of air). The index of refraction $n_1$ in the active element is swept between 1.56 and 1.73 to obtain the different light paths in this example. Thus, changing the index of refraction $n_1$ of the active element 102 can change the direction of the light ray as it enters the passive element 104. For these data, calculations using Equation (5) give the minimum incidence angle, for TIR to occur, as 43.23 degrees. Further, assume that the incidence angle at the air-active element interface is i=52.3 degrees. In addition, if the active element 102 has its index of refraction set to 1.56, then the incidence angle $i_2$ at which the light beam strikes the interface (between the passive element 104 and the ambient air) is 39.49 degrees. In this case, the incidence angle is less than the minimum angle required for TIR, causing the light beam to refract at an angle of $rr_3$ and leave out the side of the passive element 104 rather than its end.

By contrast, if the active element 102 has its index of refraction set to 1.73, the incidence angle $i_2$, in the passive element 104, is 43.299 degrees.

In this case, the incidence angle $i_2$ is greater than the minimum angle needed for TIR. As a result, the light beam is totally reflected within the passive element 104 at a reflection angle of $r_3$=$i_2$ when it strikes the interface between the air and the passive element 104 until it leaves through the end of the passive element 104.

FIGS. 5a and 5b illustrate the paths of multiple light rays corresponding to multiple indices of refraction and reflection in the active element 102. FIG. 5a illustrates the results for the example discussed above. While FIG. 5b presents results for a case where all the light rays encounters total internal reflection in the passive element 104. In this example, it is assumed that i=40 degrees, while all the other parameters are the same as in the previous example. The index of refraction $n_1$ in the active element is swept between 1.56 and 1.73 to obtain the different light paths. Thus, changing the index of refraction $n_1$ of the active element 102 can change the direction of the light ray as it leaves the end of the passive element 104.

FIG. 5a illustrates different exit paths that occur when the light ray is refracted out of the passive element 104 rather than reflected within the passive element 104. The example in FIG. 5b assumes the same passive and active element 102 characteristics as the example of FIG. 5a. The only difference between FIG. 5a and FIG. 5b is the incidence angle i at which the light enters the active element 102: for FIG. 5a, i=52.3 degrees, and for FIG. 5b i=40.0 degrees. For the example where i=52.3°, the refracted light beam can be swept over an angular change of over 20 degrees by varying the index of refraction $n_1$ in the active element 102 over a selected range, such as from 1.56 to 1.73. Further, as shown in this example, the optical device 100 can still achieve total internal reflection even with i=52.3 degrees if $n_1$ is set to 1.73.

Thus, changing the index of refraction in the active element 102 as well as the incident angle i for the light beam as it enters the optical device can direct the light beam either to exit out the side of the optical device 100 or to reflect along the length of the passive element 104 and exit out the end of the optical device 100. Further, changing the index of refraction $n_1$ in the active element 102 can sweep or switch the light beam direction at any selected time. As a result, the inventive optical device 100 can be used as a switch or scanner by placing light-responsive elements in the refracted or reflected light beam's path. Adjusting the refractive index active element 102 can then activate and de-activate the light-responsive elements thereby direct the light beam toward or away from selected light-responsive elements near the optical device 100.

Although the examples described herein assume that a light beam enters through the active element into the passive element, the optical device 100 can be adapted for any type of radiated beam. Further, the device components can be rearranged so that the radiated beam enters the passive element first before being controlled by the active element without departing from the scope of the invention. For example, the invention may allow the passive element to change the entry direction of the radiated beam into the active element (rather than vice versa) to achieve total internal reflection.

Further, although the above description teaches an embodiment using an electro-refractive material, whose index of refraction changes in response to a changing electric field, the inventive optical device can also incorporate a photo-refractive material, whose index of refraction changes in response to changes in illumination from a high-intensity light source. Either material can be use in the active element to provide a variable index of refraction.

The active element can also allow a light beam to scan over a given area or device from one position to another without mechanically moving any parts to conduct the scanning. The low operating voltage and the possible small size of the inventive device allows the invention to be incorporated into virtually any device that normally uses a mechanical switch, including common consumer devices.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. An optical device, comprising:
   a first element having a first variable index of refraction and first and second conductive substrates comprised of metal;
   a second element that communicates with the first element and has a second index of refraction; and
   an adjustment mechanism in communication with the first element to control the first index of refraction,
   wherein one of said first and second elements can change the entry direction of a radiated beam into the other of said first and second elements, the adjustment mechanism is a variable voltage source, and applying a variable voltage to the first and second conductive substrate results in a variable electric field.

2. An optical device, comprising:
   a first element having a first index of refraction; and
   a second element that communicates with the first element and has a second index of refraction,
   wherein one of said first and second elements can change the entry direction of a radiated beam into the other of said first and second elements and the radiated beam at an interface between the first element and the second element includes a spurious signal, and wherein at least one of the first element and the second element has a length that attenuates the spurious signal to a predetermined desirable level.

3. An optical device, comprising:
   an active element having
     a first conductive substrate;
     a second conductive substrate;
     a first orienting layer;
     a second orienting layer disposed on the first and second conductive substrates and facing one another; and
     a refractive layer disposed between the first and second orienting layers and having a variable index of refraction that is responsive to the electric field, and
   a passive element, wherein one of the active element and the passive element can change an entry direction of a radiated beam into the other of the active element and the passive element, and the passive element has a variable index of refraction that is fixable to a selected value.

4. An optical device, comprising:
   an active element having
     a first conductive substrate;
     a second conductive substrate;
     a first orienting layer;
     a second orienting layer disposed on the first and second conductive substrates and facing one another; and
     a refractive layer disposed between the first and second orienting layers and having a variable index of refraction that is responsive to the electric field, and
   a passive element, wherein one of the active element and the passive element can change an entry direction of a radiated beam into the active element to achieve total internal reflection of the beam in the active element.

5. An optical device, comprising:
   an active element having
     a first conductive substrate;
     a second conductive substrate;
     a first orienting layer;
     a second orienting layer disposed on the first and second conductive substrates and facing one another; and
     a refractive layer disposed between the first and second orienting layers and having a variable index of refraction that is responsive to the electric field, and
   a passive element, wherein the first and the second conductive substrates comprise metal and one of the active element and the passive element can change an entry direction of a radiated beam into the other of the active element and the passive element.

6. An optical device, comprising:
   an active element having
     a first conductive substrate;
     a second conductive substrate;
     a first orienting layer;
     a second orienting layer disposed on the first and second conductive substrates and facing one another; and
     a refractive layer disposed between the first and second orienting layers and having a variable index of refraction that is responsive to the electric field, and
   a passive element, wherein one of the active element and the passive element can change an entry direction of a radiated beam into the other of the active element and the passive element, the radiated beam at an interface between the active element and the passive element includes a spurious signal, and at least one of the active element and the passive element has a length that attenuates the spurious signal to a predetermined desirable level.

7. A method of manufacturing an optical device, the method comprising:
   providing an active element having a refractive layer having a variable index of refraction between first and second conductive layers; and
   coupling the active element to a passive element having a fixed or fixable index of refraction to form the optical device, the coupling act includes depositing an active element material on a portion of a substrate to form an active element portion and a passive element portion,
   wherein a voltage applied to the first and second conductive layers results in an electric field.

* * * * *